Sept. 3, 1968  H. L. BULL  3,400,264
DUAL COLUMN GAS CHROMATOGRAPHY APPARATUS
Filed Sept. 1, 1964
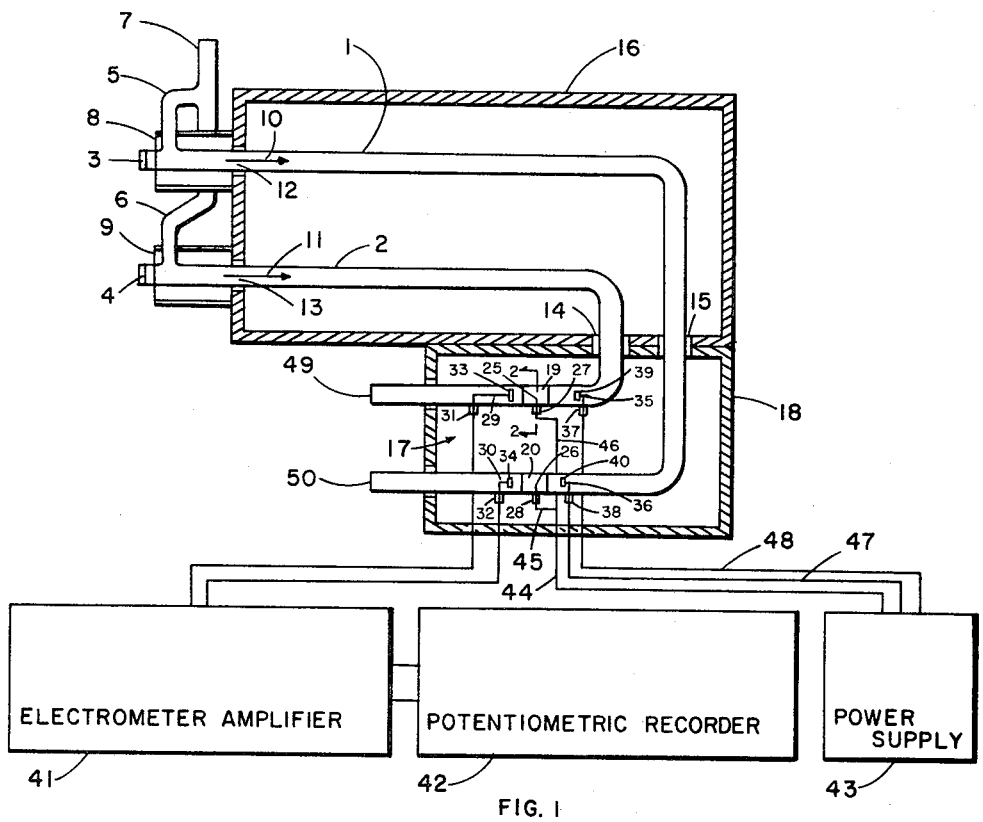
FIG. 1
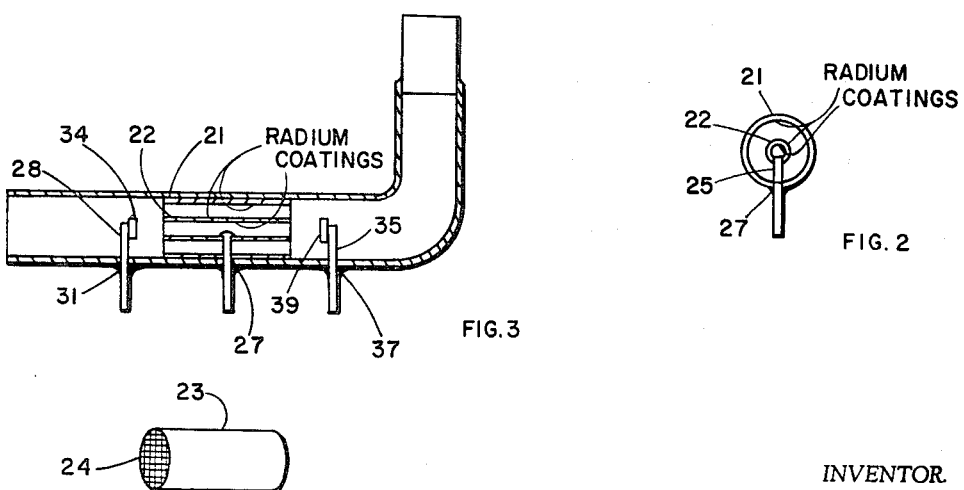
FIG. 2
FIG. 3
FIG. 4
INVENTOR.
HUGH L. BULL
BY Arthur M. Sloan

United States Patent Office 3,400,264
Patented Sept. 3, 1968

3,400,264
DUAL COLUMN GAS CHROMATOGRAPHY
APPARATUS
Hugh L. Bull, 9939 Estacado, Dallas, Tex. 75228
Filed Sept. 1, 1964, Ser. No. 393,613
8 Claims. (Cl. 250—43.5)

ABSTRACT OF THE DISCLOSURE

A gas chromatograph with an alpha source detector wherein direct ionization measurement is obtained. Electrodes are maintained at a positive voltage between 100 and 300 volts D.C. to accelerate the positive ions resulting from ionization by the alpha source toward collector electrodes which are maintained at a negative voltage between 100 and 300 volts D.C. Electrodes maintain the alpha source at a positive voltage between 20 and 50 volts D.C. to attract electrons to the alpha source to assure ionization of the sample and to replace the charge of the alpha particles that emanate from the alpha source.

---

The invention relates to the analysis of gases or substances which are subject to vaporization, by alpha source ionization detectors.

Presently known chromatographs that use alpha source detectors are argon detectors and the argon is used as a carrier with an alpha emitting particle such as radium, The measurement obtained from these chromatographs is an indirect ionization measurement since it reflects the flow of electrons from the negative (−) to the positive (+) electrodes, which increases as the ionization increases. The more the gas is ionized the more it conducts, and likewise the less it is ionized the less it conducts. The radioactive alpha source is used to begin ionization, the argon is then brought to a metastable state by the use of very high voltages in order to achieve its maximum sensitivity. (The voltages in an argon detector are normally from 800 to more than 1500 volts.) This increase ionization on collision with the sample to be analyzed by ionization of the sample, such increase depending on the identity of the sample.

My invention uses high voltage on the order of 300 volts, only to accelerate positive (+) ions through the detector source to the collector. The positive (+) ions emanate from the alpha source detector. My invention also uses a low positive (+) voltage to replace the charge of the alpha particles that emanate from the source and increase ionization.

My invention does not have a current flow due to ionization from the cathode to the anode as does the argon detector. My invention measures the number of positive ions striking the collector.

The volume of the effective area of my detector from the high voltage electrode to the collector, including the detector source, is extremely small, i.e., on the order of 1.68 cc. Because of the smaller area of my detector the flow of gases through my detector is faster than through an argon detector. The faster flow prevents the collection of contaminants on the detector source and collector which consequently increases the signal to noise ratio.

Also, the high voltages required in an argon detector burn the sample material on the electrodes causing rise in noise and necessitating frequent cleaning of the electrodes. My invention obviates this difficulty.

With my detector approximately 95% of the sample can be ionized and collected as against 5% ionization with a hydrogen flame. My detector is accordingly more sensitive than other known detectors including the argon detector.

Whereas presently known argon detectors use from 88 to 220 microcuries of radioactive material, my invention as presently constituted can operate effectively with as little as one (1) to five (5) microcuries. This not only makes my invention more economical to construct but also renders it safer to the operator.

In my invention the detector electrodes are sealed directly to glass to eliminate insulators which are a source of difficulty in argon detectors since they collect dirt and eventually cause electrical leakage, increasing noise, and lowering the signal to noise ratio. Further, by elimination of insulators and utilization of glass surfaces inside the detector the possibility of decomposition of steroids and lipids in medical and biochemical analysis is decreased. The stainless steel buckets used in argon detectors increase the possibility of decomposition of steroids and lipids.

It is an object of my invention to produce a gas chromatograph, utilizing an alpha source detector, which will detect any gas or vapor that can be ionized.

It is another object of my invention to collect positive ions that are formed and measure such positive ions to give a linear molecular percentage.

It is a further object of my invention to provide a gas chromatograph of simple construction, requiring low voltages, and effecting high signal to noise ratio.

Yet another object of my invention is to provide a gas chromatograph which obviates the possibility of destroying the sample by crossing a hot wire.

Still another object of my invention is to provide a gas chromatograph utilizing a radioactive source which is safe and harmless.

A further object of my invention is to provide a gas chromatograph with maximum sensitivity in which ionization and collection of ions is almost 100%.

Still a further object of my invention is to provide a gas chromatograph detector which is essentially permanent.

The invention also comprises novel details of construction and novel combinations and arrangements of parts which will more fully appear in the course of the following description. The drawings merely show and the description merely describes preferred embodiments of the present invention which are given by way of illustration or example.

Referring to the drawings, the invention will be explained in detail:

FIGURE 1 is a diagrammatic representation of a gas chromatograph incorporating the invention of the present application.

FIGURE 2 is a cross sectional view of the detector of the invention taken at 2—2 of FIGURE 1.

FIGURE 3 is a longitudinal sectional view of the detector of the invention.

FIGURE 4 is a view of an alternative construction of the alpha particle source.

In FIGURE 1 two chromatography columns 1 and 2 are shown. In practice these columns are usually convoluted in order to get a greater length of column in a smaller area.

At the entrance to each column 1 and 2 is a sample inlet. The sample inlets are shown as rubber septums 3 and 4 through which samples may be injected. Such septums are of the conventional self-sealing type commonly used in this art and in the pharmaceutical art. Other types of inlets known in the art may be used with my invention such as an opening with a suitable valve.

Near each sample inlet are carrier gas inlet tubes 5 and 6 which have a common inlet tube 7 through which the carrier gas is introduced. The carrier gas normally used with my invention is helium although there are other carrier gases which may be suitable.

Surrounding the columns 1 and 2 near the sample inlets 3 and 4 and surrounding portions of the carrier gas inlet tubes 5 and 6 are injection heater blocks 8 and 9 for heating the sample and carrier gas and the vaporization of liquid and solid samples.

The carrier gas carries the sample in the direction indicated by the arrows 10 and 11.

Columns 1 and 2 are sectional, being connected and sealed at points 12 and 13 to the sample and carrier gas inlets and being connected at points 14 and 15 to the detector.

Those portions of the columns 1 and 2 between the sample and carrier gas inlets and the detector are encased in column oven 16.

The detector 17 is surrounded by detector oven 18 which runs at approximately 500° C. This detector which is the primary inventive feature of my invention includes for each column radium sources 19 and 20. Suitable sources of alpha particles other than radium may be used; however, radium is preferred because of its long half-life, viz., 1620 years. Radium F, which is a pure alpha source is most desirable; however, radium D and E may also be used. Radium D and E are weak alpha and beta sources with a short half-life which decompose to radium F. Each radium source as shown comprises two concentric open ended stainless steel tubes, or cylinders, the outer tube 21 being coated on the inside with radium and the inner tube 22 being coated on the inside and outside with radium. The tubes 21 and 22 may be of platinum or silver, or other suitable material, instead of stainless steel.

In place of tubes or cylinders 21 and 22, cylinder 23 may be used as illustrated in FIGURE 4. Cylinder 23 may be thin-walled stainless steel of about 5 mm. diameter coated on the inside with a suitable alpha particle source such as radium. Cylinder 23 may be capped with screen 24 of approximately 100 mesh in which event the inside of the screen 24 is coated with a suitable alpha particle source such as radium.

Extending into each column and radium source are source electrodes 25 and 26 which maintain the radium sources at a positive (+) voltage of from 20 to 50 volts D.C. In this way electrons are attracted and collected by the radium source to assure ionization. The source electrodes may consist of molybdenum rods, or rods of other suitable material such as Kovar, which screw into the radium source inner tubes and are sealed to the columns 1 and 2, commonly of Pyrex glass, at points 27 and 28 by metal to glass seals.

Extending into the columns 1 and 2 before the entrance to the radium sources are high voltage electrodes 29 and 30 of molybdenum or other suitable material such as Kovar which are maintained at a positive voltage of from 100 to 300 volts D.C. The high voltage electrodes are sealed to the columns 1 and 2 at points 31 and 32. The high voltage electrodes 29 and 30 act as repeller grids to accelerate the positive ions through the radium source to the collector. The tips 33 and 34 of the high voltage electrodes 29 and 30 may be of silver because silver and silver oxide have the same electrical conductivity and if an oxide sample is run which oxidizes the silver, the result will not be affected. In addition, silver has a high melting point.

Extending into the columns 1 and 2 after the radium sources are collector electrodes 35 and 36 of molybdenum or other suitable material which are maintained at a negative potential of 100 to 300 volts D.C. The collector electrodes 35 and 36 are sealed to columns 1 and 2 at points 37 and 38. Further, the collector electrodes have silver tips 39 and 40 for the reasons stated above in regards to tips 33 and 34. Suitable material other than silver may be used for tips 39 and 40, for example, platinum. All gases and solute molecules of the sample as well as of the reference or carrier gas stream are ionized by the alpha particles of the radium source while flowing through or near the alpha radiating source and the positive ions are collected on the collector electrodes.

One of the columns and detectors acts as a reference and flows only carrier gas while the other column and detector flows both carrier gas and sample. My invention may, however, be utilized and gives good results with a single column and detector and no reference.

The collector electrodes are connected to an electrometer or amplifier 41 in opposition to each other so that when the carrier-reference gas is flowing in both columns without a sample, the system is in a null or balanced state; however, when there is a sample present in one of the detectors an imbalance is caused due to the ionization of the components of the sample as they flow through the alpha particle source and are collected upon the collector electrode. The imbalance signal is fed from the electrometer 41 to a potentiometric recorder 42 where it is recorded.

Power is supplied to the various positive potential electrodes by power supply 43 through wires 44, 45, 46, 47, and 48.

The gases exit from the columns 1 and 2 at exits 49 and 50.

My detector has the further advantage of extreme reliability since it has no filaments to burn out.

In addition, as noted, the collector collects all positive ions that are formed and since ion pairs are formed in accordance with the molecular structure of the compound, the results are linear according to molecular weight thus showing linear molecular percentage, as well as percent composition of the sample compound.

Still further, as noted, there is no hazard to health with my detector since when alpha particles emitted from the radium source lose their speed and pick up electrons, they become simple helium atoms and are neither explosive nor radioactive.

Since changes may be made in the above apparatus without departing from the scope of the invention herein involved, it is intended that all matter contained in the above description, or shown in the accompanying drawings, shall be interpreted as illustrative, and not in a limiting sense.

What I claim as my invention is:

1. A dual column gas chromatography apparatus including two columns, carrier gas and sample inlet sections for introduction of carrier gas and unknown sample into each column, an unknown sample being introduced into only one column during any one run, the other column serving as a reference, detector sections in each column having means for ionizing the carrier gas and unknown sample into positively charged ions, means for maintaining the ionization means at a positive potential to attract negative ions to the ionization means and replace the charge of the positive ions emanating from the ionization means, positively charged electrodes maintained at a voltage between 100 and 300 volts D.C. for accelerating the positively charged ions through the ionization means and negatively charged collector electrodes for collecting the positively charged ions, means for amplifying the signal produced by the collected positively charged ions, and means directly responsive to the signal produced by the collected positively charged ions for indicating the concentration of the unknown sample gas.

2. A dual column gas chromatography apparatus as described in claim 1 in which the means of ionization includes two concentric tubes arranged in each detector section so that the carrier gas and unknown sample pass through such tubes.

3. A dual column gas chromatography apparatus as described in claim 2 in which the inner walls of the outer tubes are coated with an alpha particle source and the inner and outer walls of the inner tubes are coated with alpha particle sources.

4. A dual column gas chromatography apparatus as described in claim 3 in which the means of maintaining the alpha particle sources at a positive potential includes electrodes extending through the concentric alpha particle sources.

5. A dual column gas chromatography apparatus as described in claim 1 in which the means of ionization includes a tube in each detector, such tube being coated on the inside with an alpha particle source and arranged so that the carrier gas and unknown sample pass through such tube.

6. A dual column gas chromatography apparatus as described in claim 5 in which the ionization tube is capped with a mesh screen coated on the inside with an alpha particle source.

7. A gas chromatography apparatus including a column, carrier gas and sample inlet sections for introduction of carrier gas and unknown sample into the column, a detector section in the column having means for ionizing the carrier gas and unknown sample into positively charged ions, means for maintaining the ionization means at a positive potential to attract negative ions to the ionization means and replace the charge of the positive ions emanating from the ionization means, positively charged electrodes maintained at a voltage between 100 and 300 volts D.C. for accelerating the positively charged ions through the ionization means and negatively charged collector electrodes for collecting the positively charged ions, means for amplifying the signal produced by the collected positively charged ions, and means directly responsive to the signal produced by the collected positively charged ions for indicating the concentration of the unknown sample gas.

8. A gas chromatography apparatus as described in claim 7 in which the means of ionization includes at least one tube coated with an alpha particle source and arranged in the detector section so that the carrier gas and unknown sample pass through each such tube.

References Cited

UNITED STATES PATENTS

| | | | |
|---|---|---|---|
| 2,943,196 | 6/1960 | Eickhoff | 250—43.5 |
| 3,009,061 | 11/1961 | Roehrig | 250—43.5 |
| 3,009,063 | 11/1961 | Roehrig | 250—83.6 |
| 3,009,098 | 11/1961 | Simons | 324—33 |
| 3,255,348 | 6/1966 | Vanderschmidt | 250—43.5 |
| 3,259,772 | 7/1966 | Bedetti | 324—33 X |

FOREIGN PATENTS 493,670   10/1938   Great Britain.

RALPH G. NILSON, *Primary Examiner.*

S. ELBAUM, *Assistant Examiner.*